United States Patent
Sorornejad

(10) Patent No.: US 12,099,473 B1
(45) Date of Patent: Sep. 24, 2024

(54) SYSTEMS AND METHODS FOR CENTRALIZED LOGGING FOR ENHANCED SCALABILITY AND SECURITY OF WEB SERVICES

(71) Applicant: Cigna Intellectual Property, Inc., Wilmington, DE (US)

(72) Inventor: Paimon Sorornejad, Manchester, CT (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 557 days.

(21) Appl. No.: 17/120,623

(22) Filed: Dec. 14, 2020

(51) Int. Cl.
| | | |
|---|---|---|
| G06F 16/174 | (2019.01) | |
| G06F 3/06 | (2006.01) | |
| G06F 16/11 | (2019.01) | |
| G06F 16/16 | (2019.01) | |
| G06F 21/60 | (2013.01) | |

(52) U.S. Cl.
CPC ........ *G06F 16/1744* (2019.01); *G06F 3/0604* (2013.01); *G06F 3/0608* (2013.01); *G06F 3/0643* (2013.01); *G06F 3/067* (2013.01); *G06F 16/128* (2019.01); *G06F 16/162* (2019.01); *G06F 21/602* (2013.01)

(58) Field of Classification Search
CPC .. G06F 16/1744; G06F 16/162; G06F 16/128; G06F 3/0604; G06F 3/0608; G06F 3/0643; G06F 3/067; G06F 21/602
See application file for complete search history.

(56) References Cited

U.S. PATENT DOCUMENTS

| | | | | |
|---|---|---|---|---|
| 5,956,504 A | * | 9/1999 | Jagadish | ............. H03M 7/3088 714/13 |
| 6,810,526 B1 | * | 10/2004 | Menard | ............... G06F 16/7844 725/50 |

(Continued)

FOREIGN PATENT DOCUMENTS

WO 2020027867 A1 2/2020

OTHER PUBLICATIONS

Paul Davies, Making the Collection of Centralised S3 Logs into Splunk easy with Lambda and SQS, Spunk.com, USA, Jun. 10, 2020.

*Primary Examiner* — Anhtai V Tran
*Assistant Examiner* — Huen Wong
(74) *Attorney, Agent, or Firm* — Stinson LLP

(57) ABSTRACT

A logging management server is provided for enhanced centralized monitoring of cloud computing platforms. The processor is configured to receive logging data sub-streams from the cloud computing platform. Each of the logging data sub-streams includes compressed logging data. The processor is also configured to apply a transformation function to each of the logging data sub-streams to obtain a transformed centralized logging data stream. The processor is further configured to transmit the transformed centralized logging data stream to write to a centralized object storage container. The processor is also configured to decompress a portion of the compressed logging data of the centralized logging data stream. The processor is further configured to identify the appended account identifier and the appended log group associated with the decompressed portion of logging data. The processor is also configured to route the decompressed portion of logging data to a sorted object storage container.

20 Claims, 7 Drawing Sheets

(56) References Cited

U.S. PATENT DOCUMENTS

| | | | | |
|---|---|---|---|---|
| 7,424,482 | B2* | 9/2008 | Kedem | G06F 3/0671 |
| 7,720,818 | B1* | 5/2010 | Laura | G06Q 40/02 |
| | | | | 707/661 |
| 8,079,081 | B1* | 12/2011 | Lavrik | H04L 41/069 |
| | | | | 726/22 |
| 8,175,418 | B1* | 5/2012 | Keith, Jr. | G06F 3/067 |
| | | | | 382/166 |
| 8,478,800 | B1* | 7/2013 | Johnson | G06F 16/904 |
| | | | | 707/827 |
| 9,092,374 | B2* | 7/2015 | Keith | G06F 3/0619 |
| 9,317,516 | B2* | 4/2016 | Koifman | G06F 3/0623 |
| 9,330,105 | B1* | 5/2016 | Duprey | G06F 16/1744 |
| 9,367,557 | B1* | 6/2016 | Lin | G06F 16/1744 |
| 9,596,492 | B2 | 3/2017 | Zimmeri | |
| 9,678,850 | B1 | 6/2017 | Rickard | |
| 9,787,332 | B2 | 10/2017 | Guilford | |
| 9,882,678 | B2 | 1/2018 | Nekuii | |
| 9,948,941 | B2 | 4/2018 | Qiu | |
| 10,038,931 | B2 | 7/2018 | Schlögl | |
| 10,700,711 | B1* | 6/2020 | Cook | G06F 16/289 |
| 11,030,187 | B1* | 6/2021 | Boodman | G06F 16/235 |
| 11,200,004 | B2* | 12/2021 | McIlroy | G06F 16/1744 |
| 11,507,283 | B1* | 11/2022 | Olson | G06F 16/909 |
| 2005/0105125 | A1* | 5/2005 | Park | H04N 1/41 |
| | | | | 358/1.15 |
| 2007/0040934 | A1* | 2/2007 | Ramaswamy | H04N 21/4408 |
| | | | | 348/385.1 |
| 2008/0152235 | A1* | 6/2008 | Bashyam | H03M 7/4018 |
| | | | | 382/224 |
| 2011/0088068 | A1* | 4/2011 | Patnoe | H04L 65/1089 |
| | | | | 709/227 |
| 2011/0276547 | A1* | 11/2011 | Koifman | G06F 3/0638 |
| | | | | 707/693 |
| 2014/0122729 | A1* | 5/2014 | Hon | H04N 1/00244 |
| | | | | 709/228 |
| 2014/0279967 | A1* | 9/2014 | Amit | G06F 16/1744 |
| | | | | 707/693 |
| 2015/0066878 | A1* | 3/2015 | Agarwal | G06F 16/285 |
| | | | | 707/693 |
| 2015/0163326 | A1 | 6/2015 | Pan | |
| 2015/0278282 | A1* | 10/2015 | Sardina | G06F 16/2343 |
| | | | | 707/704 |
| 2015/0293954 | A1* | 10/2015 | Hsiao | G06F 16/22 |
| | | | | 715/738 |
| 2017/0339640 | A1* | 11/2017 | Krishnamoorthy | |
| | | | | H04W 52/0225 |
| 2018/0069887 | A1* | 3/2018 | Chauhan | G06F 16/2477 |
| 2018/0139220 | A1 | 5/2018 | Viswanathan | |
| 2018/0191668 | A1* | 7/2018 | Yu | H04L 65/1073 |
| 2018/0217910 | A1* | 8/2018 | Yang | G06F 11/3006 |
| 2018/0349053 | A1* | 12/2018 | Battaje | G06F 12/0891 |
| 2019/0303031 | A1* | 10/2019 | Sabourin | G06F 16/9024 |
| 2019/0320211 | A1* | 10/2019 | Chen | H04N 21/2187 |
| 2019/0327486 | A1 | 10/2019 | Liao | |
| 2019/0394343 | A1* | 12/2019 | Sahara | H04N 1/00724 |
| 2020/0026545 | A1 | 1/2020 | Wang | |
| 2021/0034289 | A1* | 2/2021 | Dalmatov | G06F 3/0616 |

\* cited by examiner

SYSTEMS AND METHODS FOR CENTRALIZED LOGGING FOR ENHANCED SCALABILITY AND SECURITY OF WEB SERVICES

FIELD

The field generally relates to systems for centralized logging of web services and cloud computing platforms and enhanced methods of monitoring transactions and system health in such contexts in order to provide enhanced scalability and security.

BACKGROUND

In many modern enterprise computing, cloud computing platforms have been adopted with the goal of providing enterprises with flexible computing solutions that are responsive to changing demands and environmental conditions. Such platforms are often provided within enterprises using internal resources or through third-party solutions. A core value proposition of such platforms is the possibility for on-demand resource allocation and dynamic flexibility. However, the ability to benefit technologically from such a value proposition is directly related to the ability to monitor the platforms effectively. Absent such an ability, there is a risk that the benefits of on-demand resource allocation will not be realized because a clear view of the health and performance of the cloud computing platform is unknown.

In practice, many known cloud computing platforms face challenges in effective monitoring and thus face difficulties in realizing these technological benefits because of a lack of centralized logging tools. Notably, the lack of centralized logging for a business (or a business unit) in known cloud computing services has made provision of rapid logging and telemetry challenging. As a result, many businesses that utilize known cloud computing tools face difficulties in monitoring the health of business services and related security, audit, and compliance services. This undermines the value of the use of the cloud computing platform as a whole.

Notably, the implementation of many known cloud computing platforms entails a number of technological challenges in logging ranging from scalability to entity management. For example, known cloud computing platform logging services require a single destination, data stream, and delivery stream for each individual log group. Because of these approaches, effective logging and monitoring faces significant scalability challenges for enterprises that utilized significant numbers of accounts or log groups. In many implementations, full centralized coverage of logging entails logging hundreds or thousands of entities, rendering effective management of such entities challenging or impossible. As a result, it is difficult or impossible to obtain the desired benefits of cloud computing platforms at such scale. Known tools for improving logging in such cloud computing contexts have significant limitations including an inability to handle more than a minimal number of entities per log.

In view of the above technological challenges, systems and methods for centralized logging and monitoring of cloud computing platforms are desired in order to improve the technological benefits of such services.

BRIEF SUMMARY

In one aspect, a logging system is provided for enhanced centralized monitoring of cloud computing platforms. The system includes a cloud computing platform and a logging management server. The cloud computing platform includes at least one cloud computing server. Each cloud computing server includes a respective server processor and a respective server memory. Each cloud computing server is configured to run at least one cloud application. The logging management server has a processor and a memory. The logging management server is in communication with the cloud computing platform. The processor is configured to receive logging data sub-streams from the cloud computing platform. Each of the logging data sub-streams includes compressed logging data. The processor is also configured to apply a transformation function to each of the logging data sub-streams to decompress the compressed logging data, append an account identifier and a log group identifier to each of the logging data sub-streams, and recompress the decompressed logging data to obtain a transformed centralized logging data stream. The processor is further configured to transmit the transformed centralized logging data stream to write to a centralized object storage container. The processor is also configured to decompress a portion of the compressed logging data of the centralized logging data stream and obtain a decompressed portion of logging data. The processor is further configured to identify the appended account identifier and the appended log group associated with the decompressed portion of logging data. The processor is also configured to route the decompressed portion of logging data to a sorted object storage container specific to at least one of the appended account identifier and the log group.

In another aspect, a logging management server is provided for enhanced centralized monitoring of cloud computing platforms. The logging management server has a processor and a memory. The logging management server is in communication with a cloud computing platform further including at least one cloud computing server. Each cloud computing server includes a respective server processor and a respective server memory. Each cloud computing server is configured to run at least one cloud application. The processor is configured to receive logging data sub-streams from the cloud computing platform. Each of the logging data sub-streams includes compressed logging data. The processor is also configured to apply a transformation function to each of the logging data sub-streams to decompress the compressed logging data, append an account identifier and a log group identifier to each of the logging data sub-streams, and recompress the decompressed logging data to obtain a transformed centralized logging data stream. The processor is further configured to transmit the transformed centralized logging data stream to write to a centralized object storage container. The processor is also configured to decompress a portion of the compressed logging data of the centralized logging data stream and obtain a decompressed portion of logging data. The processor is further configured to identify the appended account identifier and the appended log group associated with the decompressed portion of logging data. The processor is also configured to route the decompressed portion of logging data to a sorted object storage container specific to at least one of the appended account identifier and the log group.

In yet another aspect, a method is provided for enhanced centralized monitoring of cloud computing platforms. The method is performed by a logging management server having a processor and a memory. The logging management server is in communication with a cloud computing platform further including at least one cloud computing server. Each cloud computing server includes a respective server processor and a respective server memory. Each cloud computing server is configured to run at least one cloud application. The method includes receiving a plurality of logging data sub-streams from the cloud computing platform. Each of the logging data sub-streams includes compressed logging data. The method also includes applying a transformation function to each of the logging data sub-streams to decompress the compressed logging data, append an account identifier and a log group identifier for each of the logging data sub-streams, and recompress the decompressed logging data to obtain a transformed centralized logging data stream. The method further includes transmitting the transformed centralized logging data stream to write to a centralized object storage container. The method also includes decompressing a portion of the compressed logging data of the centralized logging data stream and obtain a decompressed portion of logging data. The method further includes identifying the appended account identifier and the appended log group associated with the decompressed portion of logging data. The method also includes routing the decompressed portion of logging data to a sorted object storage container specific to at least one of the appended account identifier and the log group.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

In the drawings, reference numbers may be reused to identify similar and/or identical elements.

DETAILED DESCRIPTION

Figure 1:
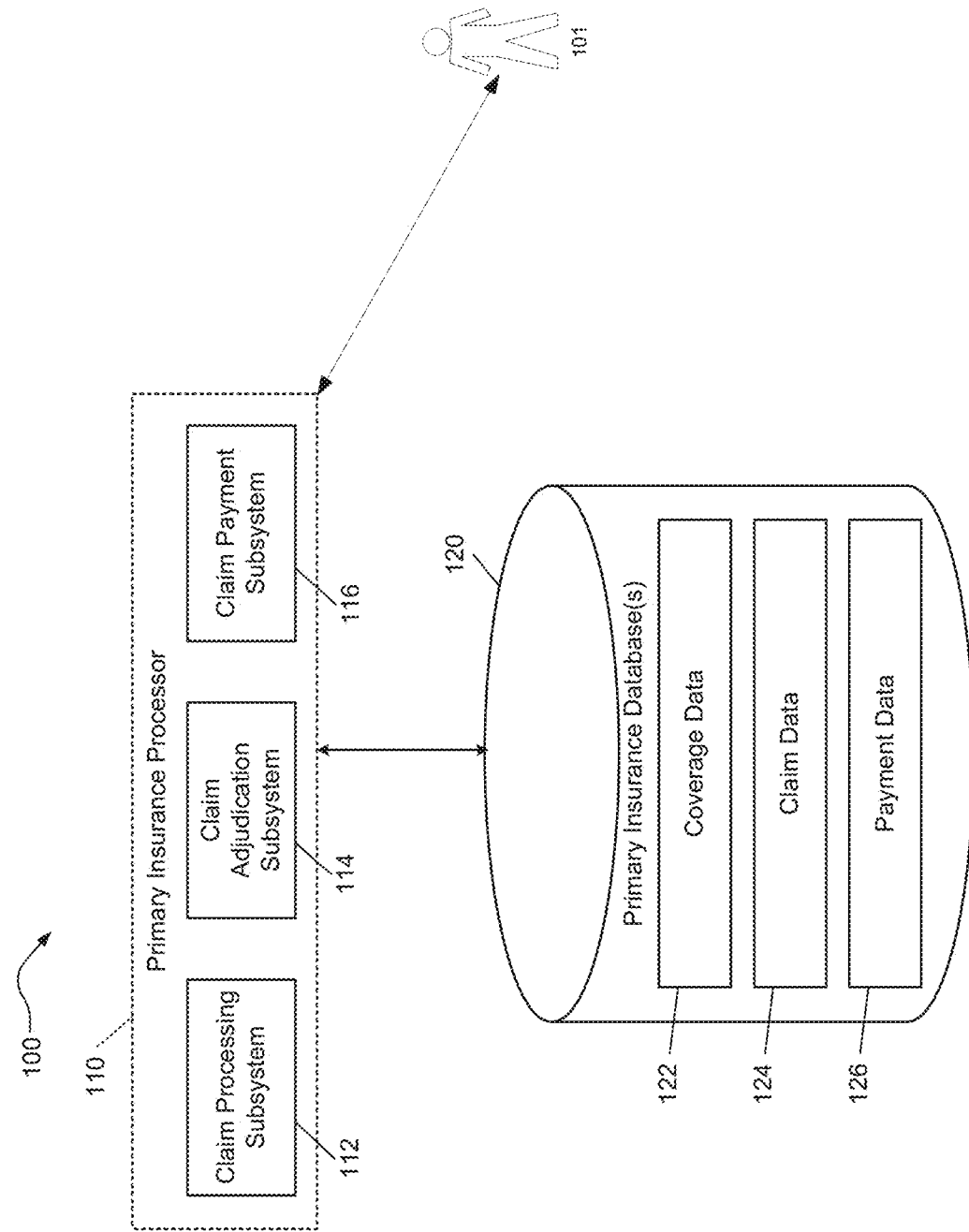
FIG. 1 is a functional block diagram of an example insurance claim processing system.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

Known cloud computing platform logging services require a single destination, data stream, and delivery stream for each individual log group. Because of these requirements, effective logging and monitoring poses a significant scalability challenge for enterprises that utilize significant numbers of accounts or log groups. In many such implementations, full centralized coverage of logging entails hundreds or thousands of log entities, rendering effective management of such entities challenging or impossible. As a result, it is difficult or impossible to obtain the desired benefits of cloud computing platforms at such scale. Specifically, many organizations leveraging cloud computing desire rapid logging and telemetry delivery in order to obtain information on the health of business services along with information regarding security, audit, and compliance.

Known cloud computing solutions provided, for example, by Amazon Web Services include a number of services that are created for each log group. (Amazon Web Services or "AWS" is a cloud computing platform provided by a subsidiary of Amazon of Seattle, WA.) In known solutions such as AWS, there are a number of challenges from scalability to entity management. Such solutions require a single destination, data stream, and delivery stream for each individual log group. Thus, this creates significant scalability challenges for organizations with high volumes of accounts in such cloud computing platforms because entities are created for each combination of account and log group. In organizations that seek to utilize automation of deployments through cloud computing platforms, there is also often a problem of hitting maximum limits on cloud management services such as, for example, AWS CloudFormation, because such services require a single stack per log group per account. Thus, scalability problems become more pronounced. Some of known cloud computing platforms face scalability concerns because they are designed for smaller scale environments without centralization practices. Further, these systems allowed for data organization in such smaller scale environments.

Underlying the known systems of cloud computing platforms are several fundamental assumptions. First, every account subscribes to its own log destination and every destination connects to its own data stream. Second, rapid transmission services (e.g., firehoses) transform streamed events and also process and validate the messages or other information provide din the data stream. The rapid transmission services submit the data to a destination stream which places the resulting log data into an object storage container (or a "bucket"). After a predetermined period of time, logged data in the object storage container may be submitted to or provided to an archive (e.g., Amazon S3 Glacier in the AWS context). Thus, in this approach, for every account there is a corresponding destination, data stream, and delivery stream. To manage these multiple entities, each command line account owner sets up any necessary templates (e.g., AWS CloudFormation Template) for each account and creates each corresponding entity. The delivery stream is directed to (or pointed at) a specific object storage group (or collection of buckets) indicated by a prefix or suitable identifier. Each account owner or logger (at the entity level) waits for the command line owner to run the necessary template and provide a destination resource identifier (e.g., AWS Amazon Resource Name) used to subscribe.

The systems and methods described herein address these known deficiencies and problems in cloud computing platforms including AWS. The centralized logging systems disclosed herein improve on known cloud computing platforms in several aspects. First, the centralized logging system improves on data streaming in cloud computing platforms by consolidating data streams (such as the AWS Kinesis data stream) into a single data stream and leveraging data partitioning or sequencing (sometimes referred to as "sharding") to ensure that end to end data streaming does not become latent. Second, the centralized logging system reduces the number of log destinations to improve the ability of organizations to monitor and leverage cloud computing services. The centralized logging system also ensures that account owners are not required to wait for the central account to create log destinations before subscribing. Known data streams such as the AWS Kinesis data stream provide "data firehoses" which are designed for rapid data transmission. The systems and methods described consolidate data streams to direct data into a single ("general") object storage container (or "bucket"). One goal effected by this technique is to ensure that all data is properly sorted into separate locations for each individual account. This method also allows any system interfaced with the result data to easily access data in an organized fashion.

The systems and methods also utilize a customized sorting assistance tool referred to as a "lambda" function. The lambda function reads data streamed into the object storage container (or "bucket") and parses (or extracts) information including log group and account identifiers. The parsed data is used to create locations (or entries) in object storage containers (or buckets) specific to both accounts and subscribed log groups. In order to protect the originally streamed data for archival and forensics, the sorted data is placed in a separate object storage location with strict data eviction policies as to not store large amounts of duplicate data.

Further, in order to facilitate data consumption by security and monitoring tools, any data written to the sorted object storage container (bucket) also causes a notification and update to a queue in a queueing service specific to each account (e.g., a Simple Queueing Service). This method allows any data aggregator to consume data on an account by account basis in a timely manner that leverages monitoring of the queueing service.

The centralized logging system provides multiple benefits. In addition to those described above, the centralized logging system allows account owners an easier adoption method by providing a single log destination and a single data stream to manage. The technique also allows for significant reduction in latency when obtaining logging and monitoring data because there is no time delay in waiting for individual destinations to be created. Use of a centralized data stream also presents easier management as only a single entity is required to be monitored. In larger data volumes, stream partitioning (through sharding or similar approaches) may be used to provide low latency delivery.

The systems and methods provided herein present significant technological benefits by improving the scalability and utility of cloud computing platforms. Further, these systems and methods also yield dramatic reductions in the required cloud computing resources for the same data volumes. Such a reduction also yields a reduction in the operational and financial costs of those resources to an organization. In one example, for the same data volume, the systems and methods provided reduced the cost of data streaming by over 25% and reduced overall operating costs for cloud computing for a consistent data volume by over 20%.

In one aspect, a centralized logging system (or a logging system) is provided for enhanced centralized monitoring of cloud computing platforms. The centralized logging system includes at least one cloud computing server and a logging management server. Each cloud computing server includes a cloud computing processor and a cloud computing memory. In the example embodiment, the cloud computing servers may be virtual computing devices and therefore the cloud computing servers may collectively function as a virtual cluster or a group of virtual clusters. In other embodiments, the cloud computing servers may be physical computing devices or a combination of physical and virtual computing devices. Each cloud computing server is configured to execute at least one software application. Each cloud computing server is also associated with an account and an account identifier. The cloud computing servers are designed to be dynamically provisioned to provide availability, redundancy, and/or security of the software application(s) associated with the cloud computing server.

The processor of the logging management server is configured to receive a plurality of logging data sub-streams from the cloud computing platform. Each of the logging data sub-streams includes compressed logging data. In the example embodiment, each logging data sub-stream represents a sub-stream of logging data specific to a particular cloud computing server and account (and account identifier). In the example embodiment, the logging sub-streams are included in the centralized logging based on detection of new cloud computing servers, new applications, and/or new accounts. In at least one example, the logging sub-streams are included based on suitable registration using, for example, CloudFormation Templates. Upon such detection or registration, account identifiers (e.g., account numbers) are published to a notification service such as Simple Notification Service. The logging management server is configured to add accounts to include in the sub-stream based on such notification. The logging management server also adds the accounts (and corresponding cloud computing server(s)) to an associated destination policy. Accordingly, the logging management server creates a single log destination for all accounts (and corresponding account identifiers and cloud computing servers) included in the received logging sub-streams.

The logging management server is also configured to apply a transformation function to each of the logging data sub-streams. In one example, the transformation function includes decompressing the compressed logging data, appending an account identifier and a log group identifier for each of the logging data sub-streams, and recompressing the decompressed logging data to obtain a transformed centralized logging data stream. Generally, the transformation function is responsible for consuming data sub-streams (or log streams) from source accounts. In one example, the logic of the transformation function includes initiating the process of transformation, consuming and decompressing event data from the sub-streams, and determining whether the event data is of a data message type. In one example, if there is no data message, the transformation function ends the procedure. In this example, if there is a data message, the transformation function further extracts information for an account identifier, an account owner, and/or a log group. The transformation function further determines if the sub-stream data includes network flow data or structured application data. If the sub-stream data includes network flow data, in one example, the transformation function performs a cleaning (or scrubbing) function including removing quotations or other markers and returns the data as text. If the sub-stream data includes application data, the transformation function retrieves the structured application message (e.g., a JavaScript Object Notation message) and appends suitable information including the account identifier, account owner, and/or log group. The transformation function further recompresses the data and delivers the message to a centralized logging data stream. In some examples, the transformation function also includes a security step whereby the message is encrypted before being placed in the centralized logging data stream.

The logging management server is also configured to transmit the transformed centralized logging data stream to write to a centralized object storage container. The centralized object storage container may be any suitable object storage container (e.g., an S3 bucket in AWS) used to receive the entirety of the centralized logging data as a "general" object storage container. In an example embodiment, the logging management server sends data to the centralized object storage container with a suitable indicator (e.g., a prefix of "general") indicating that the container and associated data general or central. The general object storage container therefore functions as a "source of truth" for checking the accuracy or consistency of all log data. In some embodiments, depending upon the needs of an organization, the general object storage container is associated with an archive policy (e.g., use of the AWS Glacier) to provide data archiving and backup of the "source of truth".

In some examples, on receipt of a new item in the general object storage container, the logging management server is configured to trigger a sorting function based on, for example, detection of the use of the prefix or indicator for a general object storage container. The sorting function is configured to sort events and other data into specific sorted object storage containers based on, for example, account identifiers, account owners, and log groups. In an example embodiment, the object storage containers used for this sorted approach use an identifier indicating that they are sorted. The identifier may be, in one example, a prefix of "sorted". Downstream services (e.g., Splunk services) may be configured to consume data included in the sorted container.

Thus, in one example, the logging management server is configured to apply one version of the sorting function by decompressing a portion of the compressed logging data of the centralized logging data stream and obtain a decompressed portion of logging data. The logging management server also identifies the appended account identifier and the appended log group associated with the decompressed portion of logging data. The logging management server also routes the decompressed portion of logging data to a sorted object storage container specific to at least one of the appended account identifier and the log group.

The logging management server is also configured to utilize partitioning to improve scalability of the data streams used herein. In one example, the logging management server is configured to partition the transformed centralized logging data stream into shards (or any other suitable partition framework for a data stream) and transmit the transformed centralized logging data stream as the plurality of shards. In some such examples, using greater numbers of partitions (e.g., shards) may improve performance and scalability.

In some examples, the logging management server utilizes a retention or expiration policy. In one such example, the logging management server is configured to identify a data expiration policy associated with the sorted object storage container specifying a maximum period to retain data. The logging management server is further configured to determine a period that the decompressed portion of logging data is stored in the sorted object storage container. The logging management server is therefore able to apply the retention or expiration policy by purging the decompressed portion of logging data upon determining that the period exceeds the maximum period to retain data.

In some examples, security considerations may render it valuable to encrypt some or all of the log data. In such examples, the logging management server is configured to apply the transformation function wherein the transformation function further encrypts the transformed centralized logging data stream. In such examples, any suitable encryption techniques or algorithms may be used including, for example, PGP, GPG, Triple DES, RSA, Blowfish, Twofish, or AES. In an example embodiment, Base64 encoding or gzip may be used for encryption and compression.

In some examples, the logging management server is also configured to utilize buffers to avoid performance or latency issues in logging functions. In some examples, the buffer may be size-based and in others it may be time-based. In one example, the logging management server is configured to apply the transformation function using a first internal buffer having a maximum buffer size. In such examples, the logging management server may be further configured to determine that the logging data sub-streams exceed the maximum buffer size, create a second internal buffer, and apply the transformation function using the first internal buffer and the second internal buffer. Thus, in such an example, a size-based buffer may use a data size threshold to determine when to change buffering. Similarly, a time-based buffer may be used to apply a timing threshold to determine when to adjust buffering.

In some examples, the logging management server provides real-time alerting about logging conditions across an environment.

Generally, the systems and methods described herein are configured to perform at least the following steps: receiving a plurality of logging data sub-streams from the cloud computing platform, wherein the logging data sub-streams include compressed logging data; applying a transformation function to the logging data sub-streams to decompress the compressed logging data, append an account identifier and a log group identifier for the logging data sub-streams, and recompress the decompressed logging data to obtain a transformed centralized logging data stream; transmitting the transformed centralized logging data stream to write to a centralized object storage container; decompressing a portion of the compressed logging data of the centralized logging data stream and obtain a decompressed portion of logging data; identifying the appended account identifier and the appended log group associated with the decompressed portion of logging data; routing the decompressed portion of logging data to a sorted object storage container specific to at least one of the appended account identifier and the log group; receiving a notification containing a plurality of registered account identifiers designated for centralized logging, wherein the registered account identifiers are associated with a corresponding cloud computing server; establishing a connection to the cloud computing servers corresponding to the registered account identifiers contained in the notification; receiving the plurality of logging data sub-streams, wherein the plurality of logging data sub-streams are obtained from the connection to the cloud computing servers; partitioning the transformed centralized logging data stream into a plurality of shards; transmitting the transformed centralized logging data stream as the plurality of shards; identifying a data expiration policy associated with the sorted object storage container specifying a maximum period to retain data; determining a period that the decompressed portion of logging data is stored in the sorted object storage container; purging the decompressed portion of logging data upon determining that the period exceeds the maximum period to retain data; applying the transformation function wherein the transformation function further encrypts the transformed centralized logging data stream; applying the transformation function using a first internal buffer having a maximum buffer size; determining that the logging data sub-streams exceed the maximum buffer size; creating a second internal buffer; and applying the transformation function using the first internal buffer and the second internal buffer.

FIG. 1 is a functional block diagram of an example insurance claim processing system 100 including a primary insurance processor system 110. Primary insurance processor system 110 includes subsystems 112, 114, and 116 capable of providing claim processing, claim adjudication, and claim payment respectively. Specifically, primary insurance processor system 110 is associated with a corresponding primary insurance database system 120. As described above and herein, database systems such as database systems 120 may include one or more than one databases that each are configured to use a DBMS. In some cases the DBMS systems may be distinct from one another. Further, each database is associated with a data schema that may be unique depending on whether the DBMS and claim category are distinct. As such, the databases include data that cannot be processed using common programs. Database systems 120 include necessary information stored on at least one of their underlying databases. Specifically, primary insurance database system 120 includes coverage data 122, claim data 124, and payment data 126.

Figure 2:
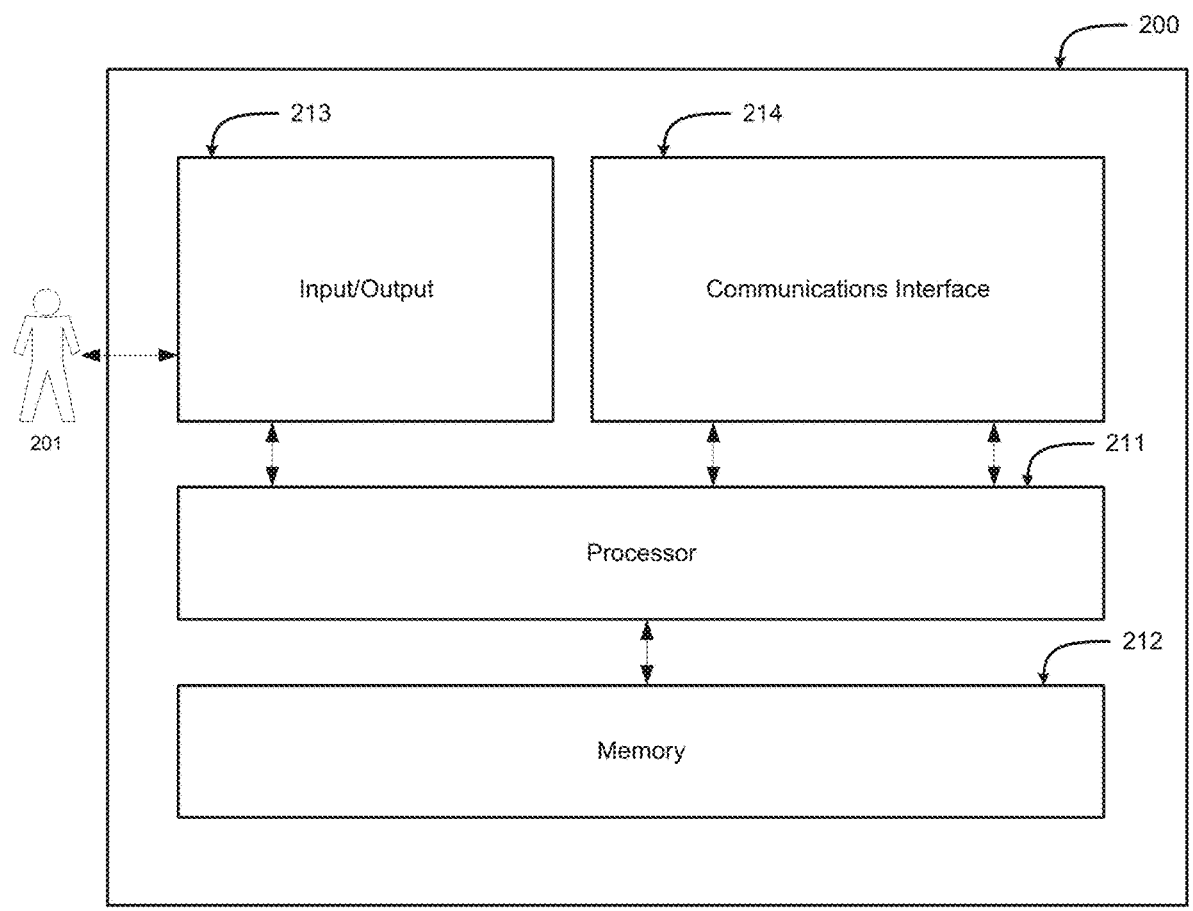
FIG. 2 is a functional block diagram of an example computing device that may be used in the centralized logging system described.
Figure 3:
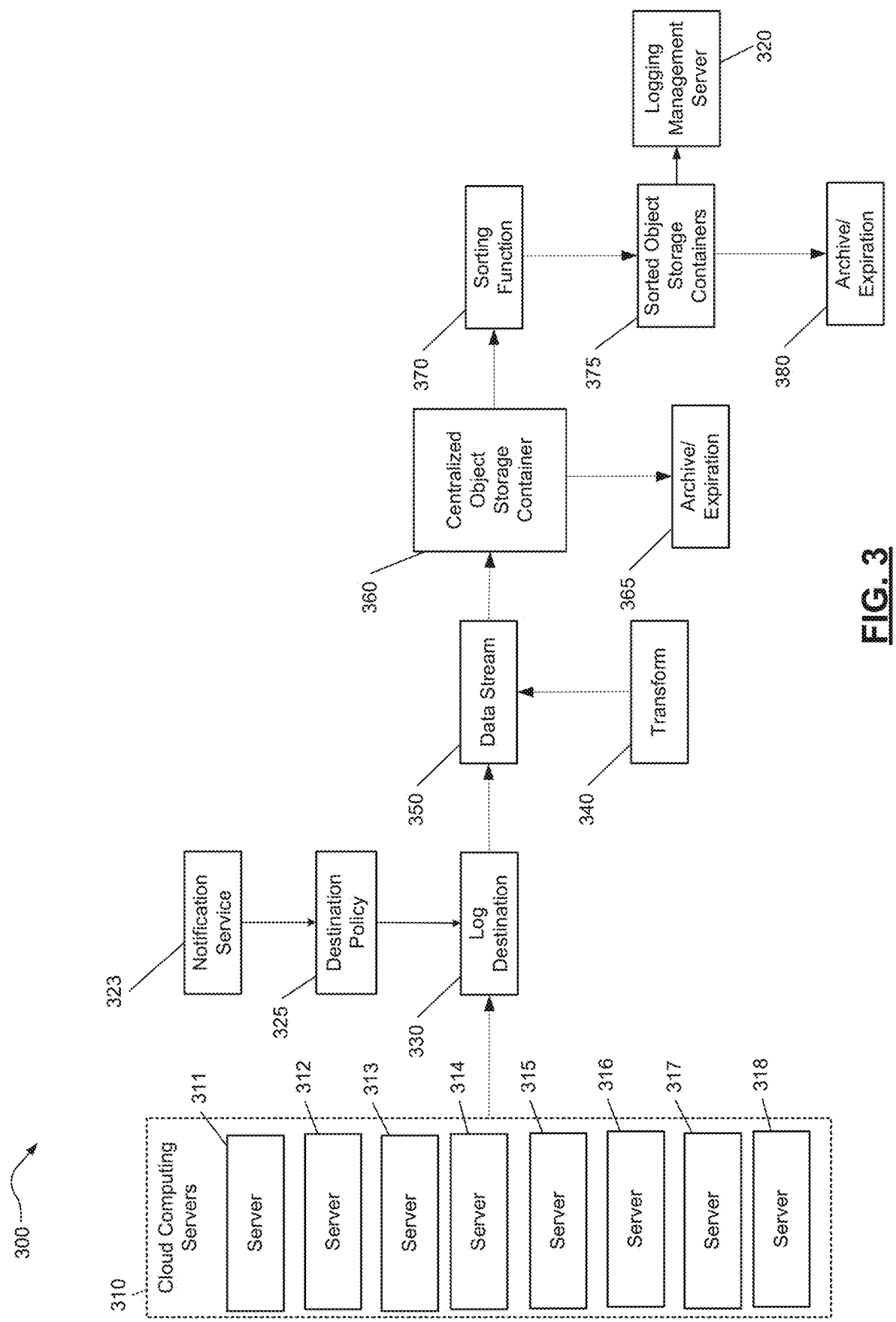
FIG. 3 is a functional block diagram of a centralized logging system that may be deployed within the system of FIG. 1 using the computing devices shown in FIG. 2.

FIG. 2 is a functional block diagram of an example computing device that may be used in the logging system described, and may represent the logging management server and the cloud computing servers (all shown in FIG. 3). Specifically, computing device 200 illustrates an example configuration of a computing device for the systems shown herein, and particularly in FIGS. 1 and 3. Computing device 200 illustrates an example configuration of a computing device operated by a user 201 in accordance with one embodiment of the present invention. Computing device 200 may include, but is not limited to, the logging management server and the cloud computing servers (all shown in FIG. 3), other user systems, and other server systems. Computing device 200 may also include servers, desktops, laptops, mobile computing devices, stationary computing devices, computing peripheral devices, smart phones, wearable computing devices, medical computing devices, and vehicular computing devices. In some variations, computing device 200 may be any computing device capable of the described methods for logging and enhanced centralized monitoring of cloud computing platforms. In some variations, the characteristics of the described components may be more or less advanced, primitive, or non-functional.

In an example embodiment, computing device 200 includes a processor 211 for executing instructions. In some embodiments, executable instructions are stored in a memory area 212. Processor 211 may include one or more processing units, for example, a multi-core configuration. Memory area 212 is any device allowing information such as executable instructions and/or written works to be stored and retrieved. Memory area 212 may include one or more computer readable media.

Computing device 200 also includes at least one input/output component 213 for receiving information from and providing information to user 201. In some examples, input/output component 213 may be of limited functionality or non-functional as in the case of some wearable computing devices. In other examples, input/output component 213 is any component capable of conveying information to or receiving information from user 201. In some embodiments, input/output component 213 includes an output adapter such as a video adapter and/or an audio adapter. Input/output component 213 may alternatively include an output device such as a display device, a liquid crystal display (LCD), organic light emitting diode (OLED) display, or "electronic ink" display, or an audio output device, a speaker or headphones. Input/output component 213 may also include any devices, modules, or structures for receiving input from user 201. Input/output component 213 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 213. Input/output component 213 may further include multiple sub-components for carrying out input and output functions.

Computing device 200 may also include a communications interface 214, which may be communicatively coupleable to a remote device such as a remote computing device, a remote server, or any other suitable system. Communication interface 214 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 214 is configured to allow computing device 200 to interface with any other computing device or network using an appropriate wireless or wired communications protocol such as, without limitation, BLUETOOTH®, Ethernet, or IEE 802.11. Communications interface 214 allows computing device 200 to communicate with any other computing devices with which it is in communication or connection.

FIG. 3 is a functional block diagram of a centralized logging system 300 that may be deployed within system 100 (shown in FIG. 1) using the computing device 200 (shown in FIG. 2). Specifically, centralized logging system 300 includes a group 310 of cloud computing servers 311, 312, 313, 314, 315, 316, 317, and 318. Each of cloud computing servers 311, 312, 313, 314, 315, 316, 317, and 318 may be virtual, physical, or a combination thereof. Nonetheless, any or each of cloud computing servers 311, 312, 313, 314, 315, 316, 317, and 318 are capable of providing applications in computing environments to provide on-demand scalability and dynamic resource allocation. Centralized logging system 300 also includes logging management server 320. As shown, logging management server 320 is in networked communication with each of cloud computing servers 311, 312, 313, 314, 315, 316, 317, and 318 through any suitable means. Although logging management server 320 appears "downstream", it is able to access, interact with, and send any instructions to the devices and components of centralized logging system 300 that are necessary to perform the steps described. In the example embodiment, logging management server 320 is configured to perform the steps to provide the centralized logging provided by centralized logging system 300. In some embodiments, logging management server 320 may utilize other devices to perform some or all necessary steps to provide such centralized logging.

As described above and herein, logging management server 320 is configured to create a single log destination 330 for all accounts on cloud computing servers 311, 312, 313, 314, 315, 316, 317, and 318. (The number of cloud computing servers in FIG. 3 is illustrative only. In operation, logging management server 320 may be used to provide centralized logging for any number of cloud computing servers.) As described above, logging management server 320 obtains sub-streams of data from each of cloud computing servers 311, 312, 313, 314, 315, 316, 317, and 318. In the example embodiment, the associated logging sub-streams are included in the centralized logging provided by logging management server 320 based on detection of new cloud computing servers, new applications, and/or new accounts. In at least one example, the logging sub-streams are included based on suitable registration using, for example, CloudFormation Templates. Upon such detection or registration, account identifiers (e.g., account numbers) are published to a notification service 323 such as Simple Notification Service. The logging management server 320 is configured to add accounts to include in the sub-stream based on such notification. The logging management server 320 also adds the accounts (and corresponding cloud computing server(s)) to an associated destination policy 325. Accordingly, the logging management server 320 creates a single log destination 330 for all accounts (and corresponding account identifiers and cloud computing servers) included in the received logging sub-streams.

Logging management server 320 is also configured to apply a transformation function 340 to the logging sub-streams to obtain a transformed centralized logging data stream 350. Logging management server 320 is also configured to transmit the transformed centralized logging data stream to write to a centralized object storage container 360. As described above, the data written to centralized object storage container 360 may be susceptible to any suitable archiving or expiration policy 365. Logging management server 320 is also configured to decompress a portion of the compressed logging data of the centralized logging data stream and obtain a decompressed portion of logging data. Logging management server 320 also identifies the appended account identifier and the appended log group associated with the decompressed portion of logging data. Based on the foregoing, logging management server 320 also routes the decompressed portion of logging data to a sorted object storage container 375. In some examples, the sorted object storage container 375 is specific to at least one of the appended account identifier and the log group. In other examples, the sorted object storage container 375 may be specific to account owners, applications, cloud computing clusters, or any suitable grouping. Sorted object storage container 375 may also be susceptible to any suitable archiving or expiration policy 380.

Figure 4:
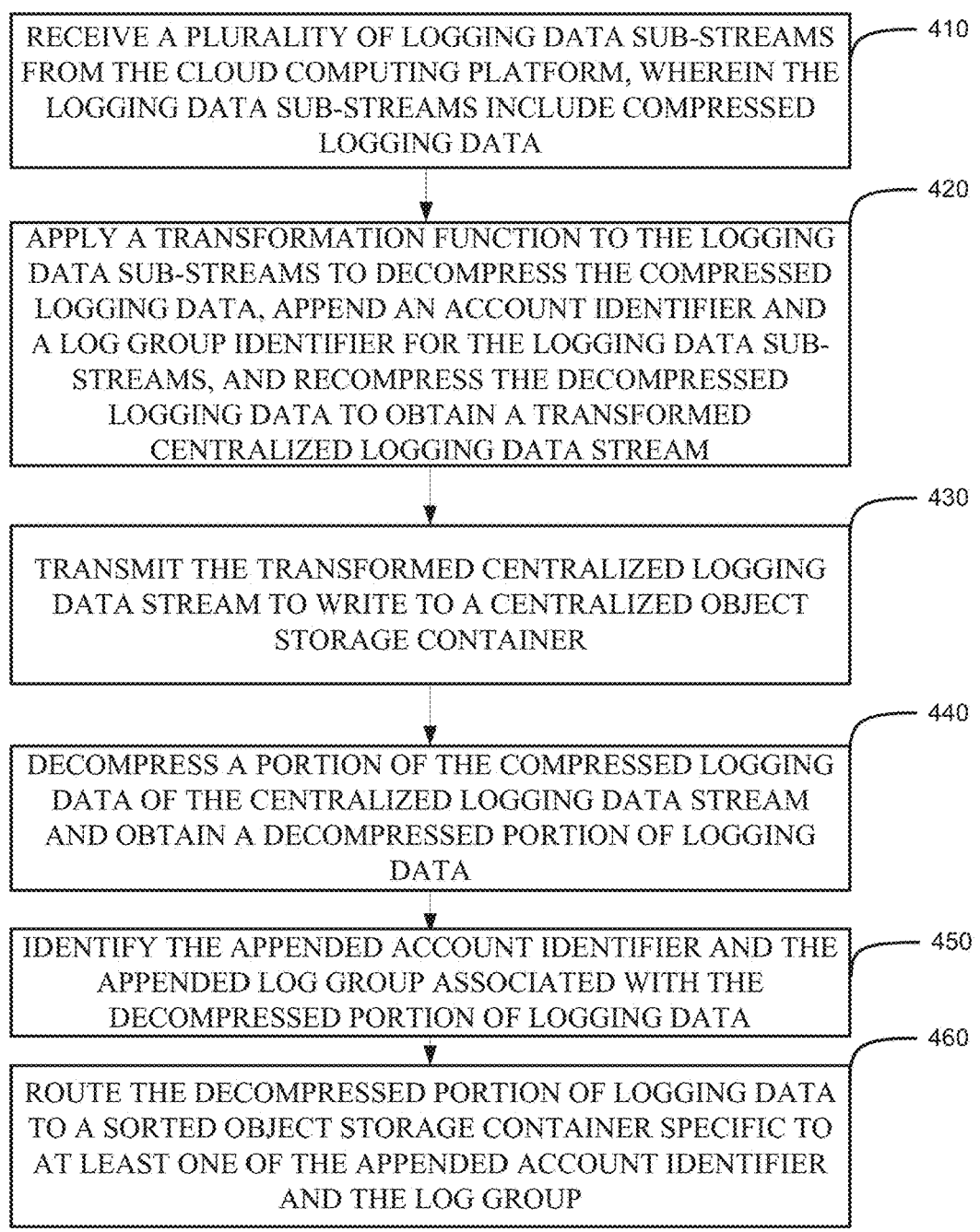
FIG. 4 is a flow diagram representing the logging and monitoring method from the perspective of the logging management server shown in FIG. 3.
Figure 5:
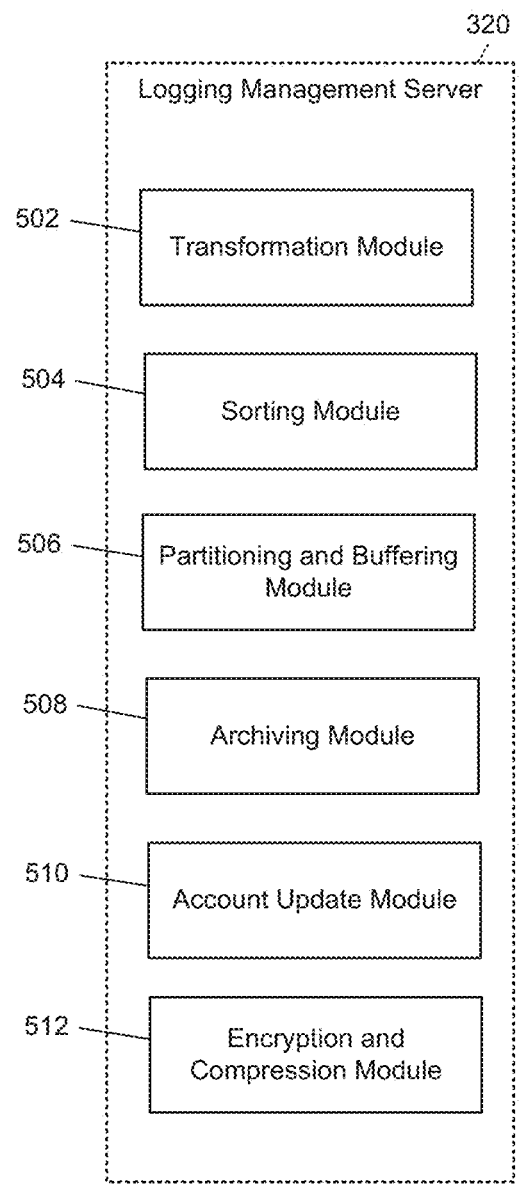
FIG. 5 is a diagram of elements of one or more example computing devices that may be used in the system shown in FIGS. 1 and 3.

FIG. 4 is a flow diagram 400 representing the centralized monitoring and enhanced centralized monitoring of cloud computing platforms from the perspective of the centralized logging system 300 (shown in FIG. 3). The logging management server 320 (shown in FIG. 3) is configured to receive 410 a plurality of logging data sub-streams from the cloud computing platform, wherein each of the logging data sub-streams includes compressed logging data. The logging management server 320 is also configured to apply 420 a transformation function to each of the logging data sub-streams to decompress the compressed logging data, append an account identifier and a log group identifier for each of the logging data sub-streams, and recompress the decompressed logging data to obtain a transformed centralized logging data stream. The logging management server 320 is additionally configured to transmit 430 the transformed centralized logging data stream to write to a centralized object storage container. The logging management server 320 is also configured to decompress 440 a portion of the compressed logging data of the centralized logging data stream and obtain a decompressed portion of logging data. The logging management server 320 is additionally configured to identify 450 the appended account identifier and the appended log group associated with the decompressed portion of logging data. The logging management server 320 is also configured to route 460 the decompressed portion of logging data to a sorted object storage container specific to at least one of the appended account identifier and the log group FIG. 5 is a diagram 500 of elements of one or more example computing devices that may be used in the system shown in FIGS. 1 and 3. Specifically, FIG. 5 describes subsystems available to logging management server 320 including a transformation module 502, a sorting module 504, a partitioning module 506, an archiving module 508, an account update module 510, and an encryption module 512. Transformation module 502 is configured to provide the "firehose" transformation function described of consuming the data sub-streams from the registered cloud computing server source accounts and processing them to the centralized logging data stream. The sorting module 504 is configured to sort the data from the centralized object storage container to consumable sorted buckets for other services (e.g., Splunk) to consume. Modules 502 and 504 are described in more detail in FIGS. 6 and 7. Partitioning and buffering module 506 is configured to provide necessary partitioning of data streams to provide scalability through the use of, for example, sharding, and to provide buffering management services to ensure scalability in streaming. Archiving module 508 is configured to provide retention or deletion policies for the data in the various object storage containers (or buckets). Account update module 510 is configured to manage the enrollment, registration, or detection of new or changing accounts so logging management server 520 accurately captures necessary sub-streams. Encryption and compression module 512 is configured to provide necessary encryption and compression techniques through the use of suitable techniques including, for example, Base64 encoding.

Figure 6:
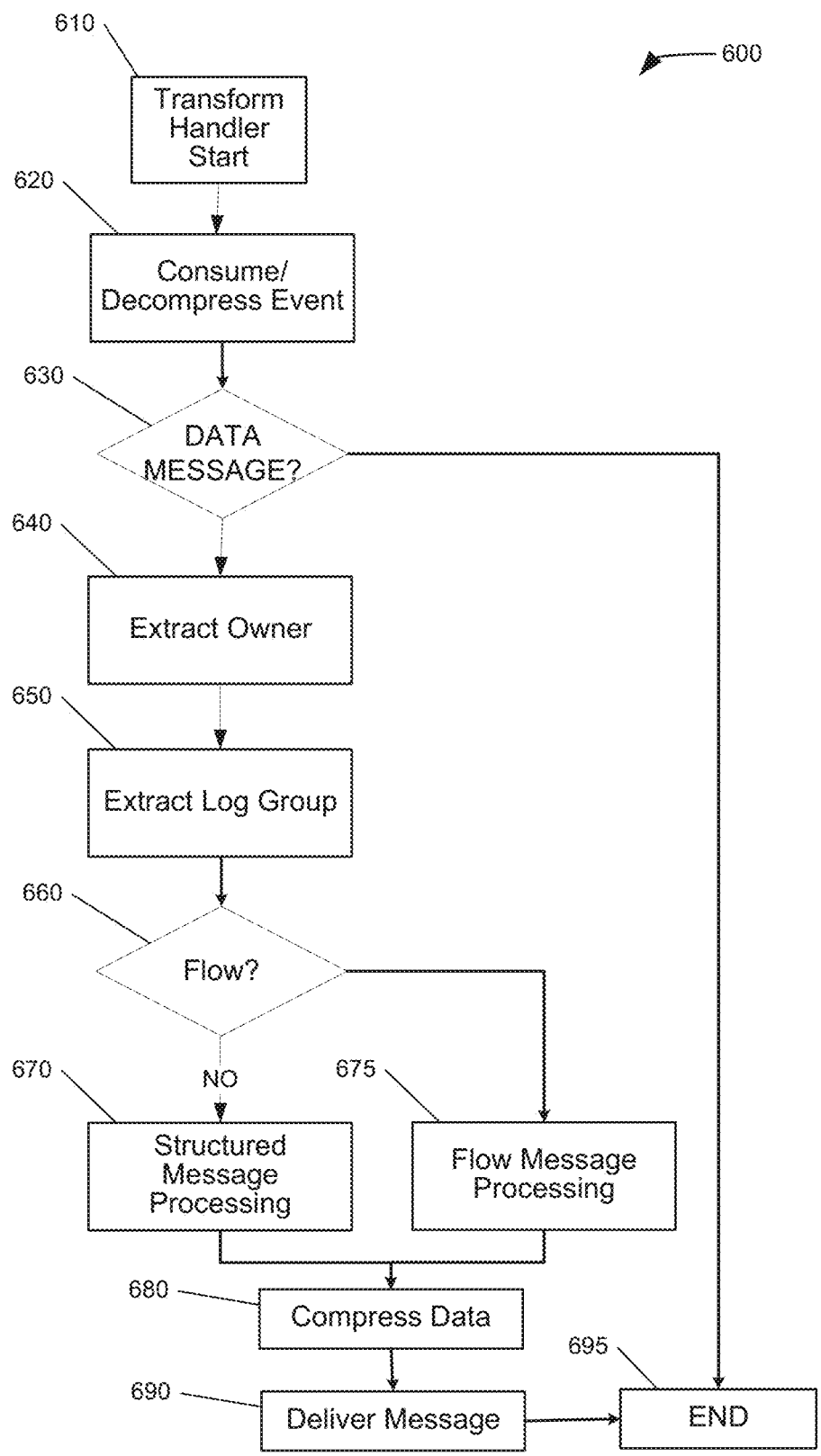
FIG. 6 is a flow diagram of a transformation function performed by the logging management server shown in FIG. 3.

FIG. 6 is a flow diagram 600 of a transformation function performed by the logging management server 320 (shown in FIG. 3). As described above, the transformation function (or "firehose transformation") is responsible for consuming data sub-streams from source accounts and making necessary transformations for processing. The logic of the transformation function includes receiving the sub-stream (or log stream) data and starting the transform handle 610 and consuming and decompressing event data 620. Logging management server 320 determines whether 630 the data contains a data message. If the data does not contain a data message, the function ends 695. If the data contains a data message, the logging management server 320 extracts an owner 640 and extracts a log group 650. In the example embodiment, the logging management server 320 determines 660 whether the data is application data or "flow log data". If the data is application data, logging management server 320 processes the data suitably with structured message processing 670. In the example embodiment, the structured message (e.g., JavaScript Object Notation messages) is retrieved and suitable data is appended including, for example, log group, account identifier, or account owner. If the data is "flow log data", logging management server 320 processes the data suitably with flow message processing 670 and, for example, performs a cleaning (or scrubbing) function including removing quotations or other markers and returns the data as text. Logging management server 320 delivers 690 the message to the centralized logging data stream and ends 695 the function.

Figure 7:
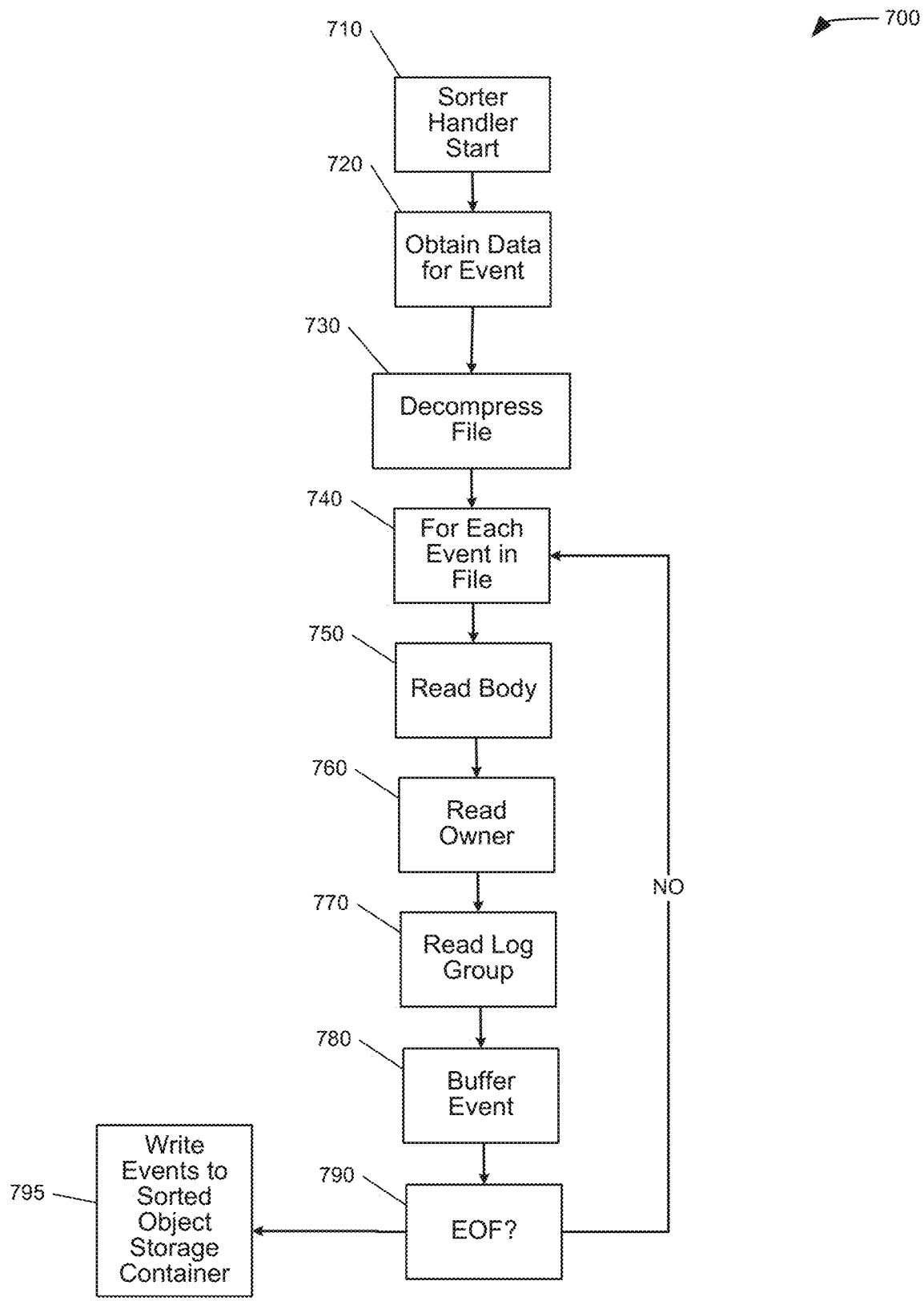
FIG. 7 is a flow diagram of a sorting function performed by the logging management server shown in FIG. 3.

FIG. 7 is a flow diagram 700 of a sorting function performed by the logging management server 320 (shown in FIG. 3). As described above, the sorting function is performed by logging management server 320 to sort the data from the centralized object storage container to consumable sorted buckets for other services (e.g., Splunk) to consume. Logging management server 320 initiates the sorting handler 710, obtains data for an event 720, and decompresses event data 730 to allow processing. For each event obtained 740, logging management server 320 processes (or ingests or reads) the event body 750, event owner, 760, and log group 770 and buffers event data 780. Logging management server 320 repeatedly checks to determine if the retrieved file associated with the data has reached its ending 790 (indicated by an "EOF" message). If the end of the file has not been reached, logging management server 320 loops back and repeats steps 740, 750, 760, 770, and 780 until the end is reached. When the end of the file is reached, logging management server 320 writes event log data to the sorted object storage container 795.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PUP (PUP: Hypertext Preprocessor), Scala, Eiffel, Smalltalk, Erlang, Ruby, Flash®, Visual Basic®, Lua, MATLAB, SIMULINK, and Python®.

What is claimed is:

1. A logging system for enhanced centralized monitoring of cloud computing platforms, said system comprising:
   a cloud computing platform including at least one cloud computing server, the cloud computing server including a respective server processor and a respective server memory, the cloud computing server configured to run at least one cloud application; and
   a logging management server having a processor and a memory, said logging management server in communication with the cloud computing platform, said processor is configured to:
      create a single log destination for a plurality of accounts included in a plurality of logging data sub-streams received from the cloud computing platform, wherein the logging data sub-streams include compressed logging data and belong to a plurality of log groups;
      apply a transformation function to the logging data sub-streams to obtain a transformed logging data sub-stream, wherein the transformation function decompresses the compressed logging data, appends an account identifier and a log group identifier to the decompressed logging data, and recompresses the decompressed logging data with the account identifier and the log group identifier appended thereon;
      transmit the transformed logging data sub-stream to write to a centralized object storage container to generate a centralized logging data sub-stream such that the centralized object storage container functions as a source of truth for use in checking accuracy or consistency of the logging data sub-streams;
      decompress a portion of the centralized logging data sub-stream to obtain a decompressed portion of the centralized logging data sub-stream;
      identify the appended account identifier and the appended log group identifier associated with the decompressed portion of the centralized logging data sub-stream; and
      route the decompressed portion of the centralized logging data sub-stream to a sorted object storage container specific to at least one of the appended account identifier and the appended log group identifier.

2. The logging system of claim 1, wherein the processor is further configured to:
   receive a notification containing a plurality of registered account identifiers designated for centralized logging, wherein the registered account identifiers are associated with a corresponding cloud computing server;
   establish a connection to the cloud computing servers corresponding to the registered account identifiers contained in the notification; and
   receive the plurality of logging data sub-streams, wherein the plurality of logging data sub-streams are obtained from the connection to the cloud computing servers.

3. The logging system of claim 1, wherein the processor is further configured to:
   leverage data partitioning or sequencing by partitioning the centralized logging data sub-stream into a plurality of shards; and
   transmit the centralized logging data sub-stream as the plurality of shards.

4. The logging system of claim 1, wherein the processor is further configured to:
   identify a data expiration policy associated with the sorted object storage container specifying a maximum period of time to retain data;
   determine a period of time that the decompressed portion of the centralized logging data sub-stream is stored in the sorted object storage container; and
   purge the decompressed portion of the centralized logging data sub-stream upon determining that the period of time exceeds the maximum period of time to retain data.

5. The logging system of claim 1, wherein the processor is further configured to:
   apply the transformation function wherein the transformation function further encrypts the transformed logging data sub-stream.

6. The logging system of claim 1, wherein the processor is further configured to:
   apply the transformation function using a first internal buffer having a maximum buffer size.

7. The logging system of claim 6, wherein the processor is further configured to:
   determine that the logging data sub-streams exceed the maximum buffer size;
   create a second internal buffer; and
   apply the transformation function using the first internal buffer and the second internal buffer.

8. A logging management server for enhanced centralized monitoring of cloud computing platforms, the logging management server having a processor and a memory, said logging management server in communication with a cloud computing platform including at least one cloud computing server, the cloud computing server including a respective server processor and a respective server memory, the cloud computing server configured to run at least one cloud application, said processor is configured to:
create a single log destination for a plurality of accounts included in a plurality of logging data sub-streams received from the cloud computing platform, wherein the logging data sub-streams include compressed logging data and belong to a plurality of log groups;
apply a transformation function to the logging data sub-streams to obtain a transformed logging data sub-stream, wherein the transformation function decompresses the compressed logging data, appends an account identifier and a log group identifier to the decompressed logging data, and recompresses the decompressed logging data with the account identifier and the log group identifier appended thereon;
transmit the transformed logging data sub-stream to write to a centralized object storage container to generate a centralized logging data sub-stream such that the centralized object storage container functions as a source of truth for use in checking accuracy or consistency of the logging data sub-streams;
decompress a portion of the centralized logging data sub-stream to obtain a decompressed portion of the centralized logging data sub-stream;
identify the appended account identifier and the appended log group identifier associated with the decompressed portion of the centralized logging data sub-stream; and
route the decompressed portion of the centralized logging data sub-stream to a sorted object storage container specific to at least one of the appended account identifier and the appended log group identifier.

9. The logging management server of claim 8, wherein the processor is further configured to:
receive a notification containing a plurality of registered account identifiers designated for centralized logging, wherein the registered account identifiers are associated with a corresponding cloud computing server;
establish a connection to the cloud computing servers corresponding to the registered account identifiers contained in the notification; and
receive the plurality of logging data sub-streams, wherein the plurality of logging data sub-streams are obtained from the connection to the cloud computing servers.

10. The logging management server of claim 8, wherein the processor is further configured to:
leverage data partitioning or sequencing by partitioning the centralized logging data sub-stream into a plurality of shards; and
transmit the centralized logging data sub-stream as the plurality of shards.

11. The logging management server of claim 8, wherein the processor is further configured to:
identify a data expiration policy associated with the sorted object storage container specifying a maximum period of time to retain data;
determine a period of time that the decompressed portion of the centralized logging data sub-stream is stored in the sorted object storage container; and
purge the decompressed portion of the centralized logging data sub-stream upon determining that the period of time exceeds the maximum period of time to retain data.

12. The logging management server of claim 8, wherein the processor is further configured to:
apply the transformation function wherein the transformation function further encrypts the transformed logging data sub-stream.

13. The logging management server of claim 8, wherein the processor is further configured to:
apply the transformation function using a first internal buffer having a maximum buffer size;
determine that the logging data sub-streams exceed the maximum buffer size;
create a second internal buffer; and
apply the transformation function using the first internal buffer and the second internal buffer.

14. A method for enhanced centralized monitoring of cloud computing platforms, said method performed by a logging management server having a processor and a memory, the logging management server is in communication with a cloud computing platform including at least one cloud computing server, the at least one cloud computing server including a respective server processor and a respective server memory, the at least one cloud computing server configured to run at least one cloud application, said method comprising:
creating a single log destination for a plurality of accounts included in a plurality of logging data sub-streams received from the cloud computing platform, wherein the logging data sub-streams include compressed logging data and belong to a plurality of log groups;
applying a transformation function to the logging data sub-streams to obtain a transformed logging data sub-stream, wherein the transformation function decompresses the compressed logging data, appends an account identifier and a log group identifier to the decompressed logging data, and recompresses the decompressed logging data with the account identifier and the log group identifier appended thereon;
transmitting the transformed logging data sub-stream to write to a centralized object storage container to generate a centralized logging data sub-stream such that the centralized object storage container functions as a source of truth for use in checking accuracy or consistency of the logging data sub-streams;
decompressing a first portion of the centralized logging data sub-stream to obtain a decompressed portion of the centralized logging data sub-stream;
identifying the appended account identifier and the appended log group identifier associated with the decompressed portion of the centralized logging data sub-stream; and
routing the decompressed portion of the centralized logging data sub-stream to a sorted object storage container specific to at least one of the appended account identifier and the appended log group identifier.

15. The method of claim 14, further comprising:
receiving a notification containing a plurality of registered account identifiers designated for centralized logging, wherein the registered account identifiers are associated with a corresponding cloud computing server;
establishing a connection to the cloud computing servers corresponding to the registered account identifiers contained in the notification; and receiving the plurality of logging data sub-streams, wherein the plurality of logging data sub-streams are obtained from the connection to the cloud computing servers.

16. The method of claim 14, further comprising:
leveraging data partitioning or sequencing by partitioning the centralized logging data sub-stream into a plurality of shards; and
transmitting the centralized logging data sub-stream as the plurality of shards.

17. The method of claim 14, further comprising:
applying the transformation function wherein the transformation function further encrypts the transformed logging data sub-stream.

18. The method of claim 14, further comprising:
applying the transformation function using a first internal buffer having a maximum buffer size;
determining that the logging data sub-streams exceed the maximum buffer size;
creating a second internal buffer; and
applying the transformation function using the first internal buffer and the second internal buffer.

19. The logging system of claim 1, wherein the processor is further configured to:
identify a first archiving or expiration policy associated with the centralized object storage container specifying a first period of time to retain data;
manage the decompressed portion of the centralized logging data sub-stream stored in the centralized object storage container in accordance with the first archiving or expiration policy;
identify a second archiving or expiration policy associated with the sorted object storage container specifying a second period of time to retain data, wherein the decompressed portion of the centralized logging data sub-stream is routed to the sorted object storage container to generate a decompressed portion of a sorted logging data sub-stream; and
manage the decompressed portion of the sorted logging data sub-stream stored in the sorted object storage container in accordance with the second archiving or expiration policy.

20. The logging system of claim 1, wherein the portion of the transformed centralized logging data sub-stream is decompressed free from another portion of the centralized logging data sub-stream, and wherein the processor is further configured to route the decompressed portion of the centralized logging data sub-stream free from another portion of the centralized logging data sub-stream to the sorted object storage container.

* * * * *